United States Patent Office 3,310,527
Patented Mar. 21, 1967

3,310,527
PROCESS FOR CURING POLYEPOXIDES AND RESULTING PRODUCTS
William De Acetis, Berkeley, and Herbert A. Newey, Lafayette, Calif., assignors to Shell Oil Company, New York, N.Y., a corporation of Delaware
No Drawing. Filed May 31, 1963, Ser. No. 284,322
13 Claims. (Cl. 260—47)

This invention relates to a process for curing polyepoxides. More particularly, the invention relates to a new process for curing polyepoxides using a special type of cyclic polymercaptan curing agent, and to the useful products obtained therefrom.

Specifically, the invention provides a new process for curing and resinifying polyepoxides at a rapid rate at low reaction temperatures which comprises mixing and reacting the polyepoxide with a compound having at least three mercapto-substituted side chains attached to one or more aromatic rings or rings which have aromatic characteristics, and preferably in addition an accelerating material such as, for example, a tertiary amine. The invention further provides cured products obtained by the above-described process.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. The conventional polyepoxide-curing agent systems, however, have certain drawbacks that have limited their use for certain applications. For example, the known systems take considerable time to cure at low temperatures. With the best aliphatic type amine curing agents, the systems take several hours to set to a hard product. Furthermore, because of the extended cure time, the epoxy coatings tend to react with atmospheric materials such as carbon dioxide and water, giving products having poor properties, such as blushing and the like. Because of this, it has been difficult to use the polyepoxide systems for applications, such as highway coatings, maintenance surface coatings and the like, where the coating must dry in a very short time, or for quality surface coatings which must cure in a short period to give a superior film.

It has been found that certain types of polymercaptans can be used to cure the polyepoxides at a rapid rate at the low temperatures. The use of these materials, however, has been limited because they have a strong odor, in some cases are toxic, and in most cases are very thick liquids or solids which are difficult to mix with the polyepoxides. Furthermore, the properties of the cured products are not as good as desired for certain applications.

It is an object of the invention, therefore, to provide a new process for curing polyepoxides. It is a further object to provide a new process for curing polyepoxides at a fast rate at low temperatures. It is a further object to provide a process for curing polyepoxides to a hard product in a matter of minutes. It is a further object to provide a process for curing polyepoxides at a fast rate to give superior products free of blushing and the like. It is a further objective to provide a rapid cure which avoids extensive reaction with carbon dioxide and water. It is a further object to provide a process for curing polyepoxides at a fast rate to form products having good strength and resistance to water, solvents and alkali. It is a further object to provide new low temperature curing agents for polyepoxides which have little or no odor. It is a further object to provide new curing agents for polyepoxides which are substantially non-toxic. It is a further object to provide a new class of polymercaptans that can be used to cure polyepoxides at low temperatures.

These and other objects of the invention will be apparent from the following detailed description thereof.

It has now been discovered that these and other objects may be accomplished by the use as curing agents for the polyepoxides of certain polymercaptans which have at least three mercapto-substituted side chains attached to one or more aromatic rings or rings which have aromatic characteristics, such as, for example, a tri(mercaptomethyl) substituted diphenyl oxide. It has been found that these special polymercaptans when combined with the polyepoxides, particularly in combination with an accelerator such as, for example, a tertiary amine, cure the polyepoxide in a matter of minutes to form a hard coating. Furthermore, the cured product has excellent hardness and strength and good resistance to water, solvents and alkali. Of particular importance is the fact that these special mercaptans have little, if any, odor, are substantially non-toxic and are generally liquids which can be easily mixed into the polyepoxide compositions without the use of solvents or diluents.

The new curing agents to be used in the process of the invention comprise the cyclic compounds having at least three mercapto-substituted side chains attached to one or more aromatic rings or rings having aromatic characteristics. By aromatic type is meant those fully conjugated planar cyclic systems possessing $(4n+2)_m$ electrons and having substantial resonance energy. See "Perspectives in Organic Chemistry," by Todd, pages 33 to 40. The compounds are preferably mononuclear but may contain two or more ring structures which may be fused or coupled together through a single bond or through another radical or radicals. The rings may be joined through a variety of coupling agents, such as alkylene groups, sulfur, oxygen, introgen, phosphorous atoms and the like. The side chains may contain other groups in addition to the mercaptan group, such as, OH, ether, esters, etc. The mercapto groups are preferably not more than 6 carbon atoms removed from the ring.

1,2,4-tri(mercaptomethyl)benzene,
1,2,3-tri(mercaptomethyl)benzene,
1,3,5-tri(mercaptomethyl)benzene,
1,3,5-tri(mercaptomethyl)-4-methyl benzene,
1,2,4-tri(mercaptoethyl)-5-isobutyl benzene,
1,2,3-tri(mercaptomethyl)-4,5-diethyl benzene,
1,3,5-tri(mercaptomethyl)-2,6-dimethyl benzene,
1,3,5-tri(mercaptomethyl)-4-hydroxy benzene,
1,2,3-tri(mercaptobutyl)-4,6-dihydroxy benzene,
1,2,4-tri(mercaptomethyl)-3-methoxy benzene,
1,2,4-tri(mercaptoethyl)-4-aminoethyl benzene,
1,3,5-tri(mercaptobutyl)-4-butoxy benzene,
1,2,4,5-tetra(mercaptomethyl)-3,6-dimethyl benzene,
1,2,4,5-tetra(mercaptoethyl)-3,6-dimethoxy benzene,
1,2,4-tri(mercaptomethyl)-3-(N,N-dimethylamino) benzene
1,3,5-tri(mercaptobutyl)-4-(N,N-dibutylamino)benzene,
1,2,4,5-tetra(mercaptomethyl)-3,6-dihydroxy benzene,
3,4,5-tri(mercaptomethyl)furan,
2,3,5-tri(mercaptoethyl)furan,
2-butyl-3,4,5-tri(mercaptomethyl)furan,
3,4,5-tri(mercaptomethyl)thiophene,
2,3,5-tri(mercaptomethyl)thiophene,
2-isobutyl-3,4,5-tri(mercaptoethyl)thiophene,
3,4,5-tri(mercaptobutyl)pyrrole,
2,3,5-tri(mercaptomethyl)pyrrole,
2,4,6-tri(mercaptomethyl)pyridine,
2,3,5-tri(mercaptomethyl)pyridine,
2,4,6-tri(mercaptomethyl)-5-butyl pyridine,
2,4,6-tri(mercaptomethyl)-5-vinyl pyridine,
2,3,5-tri(mercaptobutyl)-4-allyl pyridine,
2,3,5-tri(mercaptomethyl)thionaphthene,
2,3,5-tri(mercaptomethyl)quinoline,
3,4,6-tri(mercaptomethyl)isoquinoline.

Other examples of these compounds include, among others, the poly(mercaptoalkyl) substituted benzenes, the poly(mercaptoalkyl) substituted naphthalenes, the poly(mercaptoalkyl) substituted bisphenyls, the poly(mercaptoalkyl) substituted bis(phenyl) alkanes, poly(mercaptomethyl) bis(hydroxyphenyl)alkanes, the poly(mercaptoalkyl) substituted bis(hydroxyphenyl) sulfones, poly(mercaptomethyl) substituted bis(phenyl)sulfone, the poly(mercaptoalkyl) substituted bis(hydroxyphenyl)sulfides, the poly(mercaptoalkyl) substituted bis(hydroxyphenyl) oxides, poly(mercaptoalkyl) substituted bis(phenyl)oxides, poly(mercaptoalkyl) substituted bis(chlorophenyl)alkanes and the like.

Specific examples include, among others:
4-mercaptomethylphenyl-4′,5′-dimercaptomethylphenyl-methane,
2,2-bis(4,5-dimercaptomethylphenyl)propane,
2,2-bis(4,6-dimercaptobutylphenyl)butane,
4-mercaptomethylphenyl-3′,4′-dimercaptomethylphenyl oxide,
4-mercaptomethylphenyl-3′,4′-dimercaptomethylphenyl sulfone,
2,2-bis(4,5-dimercaptoethylphenyl)sulfide,
the 3,4-dimercaptomethylphenyl ester of carbonic acid,
the 3,4-dimercaptoethylphenyl ester of maleic acid,
1,3,5-tri(mercaptomethyl)-2,4,6-trimethylbenzene,
2,2-bis(3-butyl-4,5-dimercaptoethylphenyl)hexane,
1,3,5-tri(4-mercapto-2-thiabutyl)benzene,
1,3,5-tri(4-mercapto-2-oxabutyl)benzene,
2,3-bis(4,5-dimercaptobutyl-3-chlorophenyl)butane,
4-mercaptobutylphenyl-3′,4′-dimercaptomethylphenyl oxide,
3-mercaptobutylphenyl-2′,4′-dimercaptobutylphenyl oxide,
and compounds of the formula

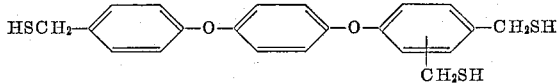

and

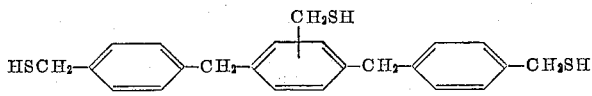

Also included in the above are the polymeric polymercaptans as obtained by joining two or more of the above compounds together as

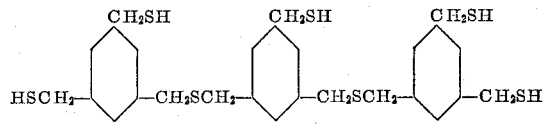

or by coupling reactions with dialdehydes and the like.

Preferred members of the above group comprise the polymercaptans of the general formulae

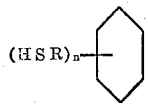

and

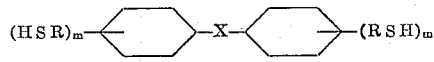

wherein R is an organic radical and preferably a hydrocarbon or thia or oxa-substituted hydrocarbon radical containing 1 to 10 carbon atoms, $n$ is an integer of at least 3, and preferably 3 to 5, X is nothing or a coupling group as an alkylene radical, S, O, or hydrocarbon radical containing S and O, one $m$ is at least 2, and the other $m$ is an integer of 1 or more, with the total of the 2 $m$'s being preferably from 3 to 5.

Of special interest are the poly(mercaptoalkyl)benzenes, poly(mercaptoalkyl)biphenyls, the poly(mercaptoalkyl)bisphenyl alkanes, the poly(mercaptoalkyl)bisphenyl sulfides, the poly(mercaptoalkyl)bisphenyl oxides, and the poly(mercaptoalkyl)bisphenyl sulfones, wherein there are at least three of the said mercaptoalkyl groups and each alkyl group contains from 1 to 5 carbon atoms.

Also of special interest are those of the formula

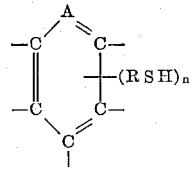

wherein A is a member of the group consisting of nitrogen or —CH, R is a bivalent radical, such as an aliphatic radical, containing 1 to 6 carbon atoms, $n$ is an integer of 3 to 5, and the ring carbon atoms not attached to the —RSH groups are attached to a member of the group consisting of hydrogen, halogen, and alkyl radicals, and those of related formula

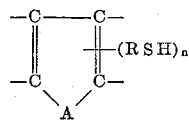

wherein A is a member of the group consisting of O, N and S and R is as noted above, $n$ is an integer of 3 to 4 and the ring carbon atoms not attached to the —RSH groups are attached to a member of the group consisting of hydrogen, halogen and alkyl radicals.

The polymercaptans of the present invention can be prepared by a variety of different methods. They may be prepared, for example, by reacting the corresponding chloride compound with an alkali metal hydrosulfide, such as NaSH. The corresponding chlorides may be prepared by any of the conventional techniques. The chloromethyl derivatives, for example, may be obtained by the well-known method of reacting the aromatic compound or aromatic acting compound with formaldehyde and HCl.

The reaction of the chlorides with the sodium bisulfide is illustrated by the following equation showing the preparation of 4-mercaptomethylphenyl-3′,4′-dimercaptomethylphenyl oxide from 4-chloromethylphenyl-3′,4′-di(chloromethyl)phenyl oxide:

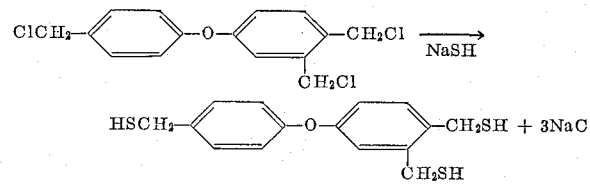

The sodium hydrosulfide used in the reaction is preferably formed in situ by the reaction of NaOH with hydrogen sulfide. The sodium hydrosulfide is preferably employed in excess of that needed to convert the halogen atoms, and is preferably used in amounts varying from about 2 to 5 times the amount needed for conversion. The reaction with the sodium hydrosulfide is preferably accomplished in the presence of a solvent, such as ethanol, methanol, tetrahydrofuran, water or mixtures thereof. The temperature employed in the reaction will preferably vary from about 40° C. to about 150° C. with a preferred range varying from about 40° C. to 80° C. In recovering the desired product, the hydrogen sulfide pressure is released, the reaction mixture neutralized with acetic acid and the mixture stripped of solvent and distilled or extracted to obtain the desired polymercaptan.

The above desired new polymercaptans of the present invention are fluid to viscous liquids or solids. They have active mercapto groups and at least three per molecule. They are generally free of odor and substantially non-toxic. They are soluble in conventional solvents, such as benzene, hydrocarbons, ethers, esters and the like. They are also compatible with conventional resins, tar oils, polymers and the like, such as asphalts, coal tars, rosin, phenol-formaldehyde resins, vinyl polymers, and particularly epoxy resins.

As noted above, they are particularly useful and valuable as curing agents for the polyepoxides.

The polyepoxides to be used in the process of the invention comprise those materials possessing more than one vicinal epoxy group, i.e., more than one

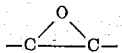

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut, and dehydrated castor oil, methyl linoleat, butyl inoleate, ethyl 9,12-octadecadienoate, butyl 9,12,15-octadecatrienoate, butyl eleostearate, monoglycerides of tung oil fatty acids, monoglycerides of soybean oil, sunflower rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl)oxalate, di(2,3-epoxyhexyl) succinate, di(3,4-epoxybutyl)maleate, di(2,3-epoxyoctyl) pimelate, di(2,3-epoxybutyl)phthalate, di(2,3-epoxyoctyl) tetrahydrophthalate, di(4,5 - epoxydodecyl)maleate, di(2,3 - epoxybutyl)tetraphthalate, di(2,3 - epoxypentyl)thiodipropionate, di(5,6 - epoxytetradecyl)diphenyldicarboxylate, di(3,4 - epoxyheptyl)sulfonyldibutyrate, tri(2,3-epoxybutyl)-1,2,4-butanetricarboxylate, di(5,6-epoxypentadecyl)tartarate, di(4,5-epoxytetradecyl)maleate, di(2,3-epoxybutyl)azelate, di(3,4 - epoxybutyl)citrate, di(5,6-epoxyoctyl)cyclohexane-1,2 - dicarboxylate, di(4,5-epoxyoctadecyl)malonate.

Another group of the epoxy-containing materials includes those epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials include epoxidized derivatives of polyethylenically unsaturated polycarboxylic acids such as, for example, dimethyl 8,9,12,13-diepoxyeicosanadioate, dibutyl 7,8,11,12-diepoxyoctadecanedioate, dioctyl 10,11-diethyl-8,9,12,13-diepoxy-eicosanedioate, dihexyl 6,7,10,11 - diepoxyhexadecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6 - diepoxycyclohexane-1,2-dicarboxylate, dibenzyl 1,2,4,5 - diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixture thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epicholorhydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g.) and melting point 85° C., polyglycidyl ether of 1,1,5,5-tetrakis(hydroxyphenyl)pentane (epoxy value of 0.514 eq./100 g.) and the like and mixtures thereof.

The amount of new polymercaptans to be employed in the cure of the polyepoxide may vary within certain limits. In general, the polyepoxides are combined with at least .8 equivalent of the polymercaptan. As used herein "equivalent" amount refers to that amount needed to furnish one —SH group per epoxy group to be reacted. Preferably the polymercaptans and polyepoxides are combined in chemical equivalent ratios varying from .8:1.5 to 1.5:8.

It is preferred in some cases to employ activators for the cure. Examples of these include, among others, phenols, sulfides, organic phosphines, organic arsines, organic antimony compounds, amines, amine salts or quaternary ammonium salts, etc. Preferred activators are the phenols, phosphines, arsines, amines, and sulfides, such as, for example, benzyldimethylamine, dicyandiamide, p,p'-bis(dimethylaminophenyl)methane, pyridine, dimethyl aniline, dimethylethanolamine, methyldiethanolamine, morpholine, dimethylaminopropylamine, dibutylaminopropylamine, stearyldimethylamine, tri-n-butyl amine, tri-n-hexylamine, ethyl di-n-propylamine, dibutyl sulfide, dioctyl sulfide, dicyclohexyl sulfide and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctyl ammonium chloride, and the like, and mixtures thereof.

Preferred activators to be used are the sulfides, phosphines and tertiary amines, and more preferably the mono- and diamines wherein the amine hydrogens have been replaced by aliphatic, cycloaliphatic or aromatic hydrocarbon radicals containing not more than 15 carbon atoms, such as, for example, the trialkyl amines, triaryl amines, triarylalkylamines, alkyl arylalkylamines, tricycloalkylamines, alkyl dicycloalkylamines, diaminoalkanes, and di(aminoaryl)alkanes. Preferred amine salts are the hydrochloride, sulfate and acetate of the above-described preferred amines. The preferred quaternary salts are those of the formula

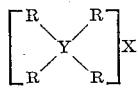

wherein Y is nitrogen, R is an alkyl, aryl or arylalkyl radical, preferably containing no more than 12 carbon atoms and X is chlorine.

The activators noted above are generally employed in amounts varying from 0.1 part to 4 parts per 100 parts of polyepoxide, and preferably from 1 part to 3 parts per 100 parts of polyepoxide.

In curing the polyepoxides, it is usually desirable to have the polyepoxide in a mobile condition when the polymercaptan is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxide. These may be volatile solvents which escape from the polyepoxide compositions containing the adduct by evaporation before or during the curing such as, esters such as ethyl acetate, butyl acetate, Cellosolve acetate (ethylene glycol monoacetate), methyl Cellosolve acetate (acetate ethylene glycol monomethyl ether), etc., ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide mixture.

Various other ingredients may be mixed with the polyepoxide subjected to cure with the novel adducts including pigments, fillers, dyes, plasticizers, resins, and the like.

The polyepoxides may be cured with the new polymercaptans by merely mixing the two components together, preferably in the presence of the above-noted activators. The cure time may vary from a few minutes to a few hours, depending on the type and quantity of reactants and presence of catalyst. In general, in the presence of activators, the cure takes place readily at room temperature. Fast reaction may be obtained, of course, by applying heat. Preferred temperatures range from about 20° C. to 200° C. With small castings, it is preferred to cure at room temperature and then post cure for a few minutes.

One important application of the use of the new polymercaptans as curing agents for polyepoxides is in the preparation of laminates or resinous particles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like. It is useful to prepare the laminates from woven glass cloth that has been given prior treatment with well-known finishing or sizing agents, therefore, such as chrome methacrylate or vinyl trichlorosilane.

In preparing the laminate, the sheets of fibrous materials are preferably first impregnated with the mixture of the polyepoxide, polymercaptan and activator. This conveniently accomplished by dissolving the polymercaptan in a solvent and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured by the application of heat. A plurality of the impregnated sheets can be superimposed and the assembly cured in a heated press under a pressure of about 25 to 500 or more pounds per square inch. The resulting laminate is extremely strong and resistant against the action of organic and corrosive solvents.

The new compositions of the invention are particularly outstanding as adhesives. In this application they can be used as a paste or solution depending on the method of preparation as described above. Other materials may also be included in the composition, such as pigments, plasticizers, stabilizers and reinforcing fillers, such as aluminum powder, asbestos, powdered mica, zinc dust, bentonite, ground glass fibers, Moneta clay and the like. These fillers are preferably used in amounts varying from about 10 parts to 200 parts per 100 parts of the polyepoxide and polymercaptan compound. Other materials that may be included include other types of resins, such as phenol-aldehyde resins, urea-aldehyde resins, furfural resins, polyacetal resins, carbonate resins, polyamide resins, and the like.

The compositions may be used in the bonding of a great variety of different materials, such as metal-to-metal to other materials, such as plastic, wood-to-wood, glass-to-glass, glass-to-metal, and the like. They are of particular value, however, in the bonding of metals such as aluminum-to-aluminum and steel-to-steel. When applied as an adhesive, the compositions may simply be spread on the desired surface to form films of various thicknesses, e.g., 0.5 mil to 30 mils, and then the other surface superimposed and heat applied. Curing pressures can be light contact pressures up to about 500 p.s.i.

When the compositions are used as adhesives for metal-to-metal bonding, it has sometimes been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperatures, but also retain good strength even though heated at quite elevated temperatures for long periods of time. A preferred tape for such use comprises a glass fiber textile impregnated or coated with a mixture of the polyepoxide, phthalocyanine compound and atomized aluminum powder or dust.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise specified, parts described in the examples are parts by weight. The polyethers referred to herein by letter are those described in U.S. 2,633,458.

*Example I*

This example illustrates the preparation and properties of 4 - mercaptomethylphenyl - 3',4' - di(mercaptomethyl) phenyl oxide.

100 parts of sodium hydroxide and 900 parts of ethanol were charged to a reaction vessel equipped with stirrer, condenser, dropping funnel, nitrogen and hydrogen sulfide purge. This mixture was cooled and saturated with hydrogen sulfide. The mixture was then heated to 50° C. and then 100 parts of 4-chloromethylphenyl-3',4'-di-(chloromethyl)phenyl oxide and 100 parts of tetrahydrofuran added slowly over a period of 3 hours. The mixture was stirred for another 3 hours at 50° C. with hydrogen sulfide purge. With nitrogen purge, ice was then added to the reaction mixture and acetic acid (95 parts) was added until the pH of the mixture was 5–6. Water was then added and the mixture extracted with 3 portions of chloroform. The extracts combined, dried and solvent stripped off. The resulting product was a viscous oil identified as 4-mercaptomethylphenyl-3',4'-di(mercaptomethyl)phenyl oxide:

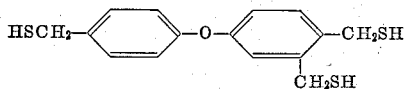

About 100 parts of Polyether A (polyglycidyl ether of 2,2-bis(4-hydroxyphenyl)propane), 65 parts of the above-described 4-mercaptomethylphenyl - 3',4' - di(mercaptomethyl)phenyl oxide, and 2 parts of 2,4,6-tris(dimethylaminomethyl)phenol, and 20 parts of solvent made up of equal volumes of toluene and methyl ethyl ketone were mixed together with stirring. The resulting fluid composition was spread out as a coating (about 2.5 mils thick) on tin panels. The coating was allowed to cure at 25° C. The resulting product was a hard tough solvent resistant coating. It was cotton free in about 30 minutes, and set hard in 40 minutes. The coating had excellent physical properties and was free of blushing.

*Example II*

This example illustrates the preparation and properties of 4-mercaptomethylphenyl - 3',4' - di(mercaptomethyl) phenyl propane.

100 parts of sodium hydroxide and 900 parts of ethanol were charged to a reaction vessel equipped with a stirrer, condenser, dropping funnel, nitrogen and hydrogen sulfide purge. This mixture was cooled and saturated with hydrogen sulfide. The mixture was then heated to 50° C. and then 100 parts of 4-chloromethylphenyl-3',4'-di(chloromethyl)phenyl propane and 100 parts of tetrahydrofuran added over a 3 hour period. The mixture was stirred for another 3 hours at 50° C. with hydrogen sulfide purge. With nitrogen purge, ice was then added to the reaction mixture and acetic acid (95 parts) was added until the pH of the mixture was 5–6. Water was then added and the mixture extracted with 3 portions of 500 ml. of chloroform. The extracts combined, dried and solvent stripped off. The resulting product was a viscous oil identified as 4-mercaptomethylphenyl-3',4'-di(mercaptomethyl)phenyl propane:

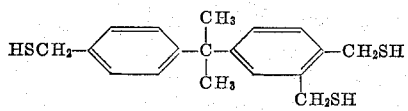

About 100 parts of Polyether A, 57 parts of the above-described 4-mercaptomethylphenyl - 3',4' - di(mercaptomethyl)phenyl propane and 2 parts of 2,4,6-tris(dimethylaminomethyl)phenol and 30 parts of solvent made up of toluene and methyl ethyl ketone were mixed together with stirring. The resulting fluid composition was spread out as a coating (about 2.5 mils thick) on tin panels. The coating was allowed to cure at 25° C. The resulting product was a hard tough solvent resistant coating. It was cotton free in about 30 minutes.

*Example III*

This example illustrates the preparation and properties of 4-mercaptomethylphenyl - 3',4' - di(mercaptomethyl) phenyl sulfone.

100 parts of sodium hydroxide and 900 parts of ethanol were charged to a reaction vessel equipped with stirrer, condenser, dropping funnel, nitrogen and hydrogen sulfide purge. This mixture was cooled and saturated with hydrogen sulfide. The mixture was then heated to 50° C. and then 100 parts of 4-chloromethylphenyl-3',4'-di-(chloromethyl)phenyl sulfone and 100 parts of tetrahydrofuran added over 3 hour period. The mixture was stirred for another 3 hours at 50° C. with hydrogen sulfide purge. With nitrogen purge, ice was then added to the reaction mixture and acetic acid (95 parts) was added until the pH of the mixture was 5–6. Water was then added and the mixture extracted with 3 portions of chloroform. The extracts combined, dried and solvent stripped off. The resulting product was identified as 4-mercaptomethylphenyl - 3',4' - di(mercaptomethyl) phenyl propane:

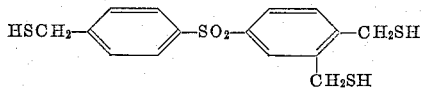

About 100 parts of Polyether A, 60 parts of the above-described 4-mercaptomethylphenyl - 3',4' - di(mercaptomethyl)phenyl sulfone and 2 parts of dimethylaminoethylphenol and 40 parts of solvent made up of methyl ethyl ketone were mixed together with stirring. The resulting fluid composition was spread out as a coating (about 2.5 mils thick) on tin panels. The coating was allowed to cure at 25° C. The resulting product was a hard tough solvent resistant coating. It was cotton free in about 30 minutes.

*Example IV*

Toluene is reacted with formaldehyde and HCl to form the trichloromethyl derivative and this is then reacted with NaSH as in the preceding examples. The resulting product, methyl-tri(mercaptomethyl)benzene, is recovered as a light-colored liquid.

About 100 parts of Polyether A, 40 parts of the above-noted methyl-tri(mercaptomethyl)benzene and 2 parts of dibutylsulfide and 20 parts of solvent made up of equal volumes of toluene and methyl ethyl ketone are mixed together with stirring. The resulting fluid composition is spread out as a coating and allowed to cure at 25° C. the film dries in a few minutes to form a hard tough coating.

*Example V*

Example IV is repeated with the exception that the polymercaptan is replaced with each of the following: 1,2,4-tri(mercaptoethyl)-3-butyl benzene; 1,2,4-tri(mercaptomethyl)-3,5-dimethyl benzene; 1,3,5-tri(mercaptomethyl)-4-methoxy benzene; 1,3,5-tri(mercaptomethyl)-4-hydroxybenzene; 3,4,5-tri(mercaptomethyl)furan; 3,4,5-tri(mercaptomethyl)thiophene; and 2,4,6-tri(mercaptomethyl)pyridine. Related results are obtained in each case.

*Example VI*

Examples I to III are repeated with the exception that the accelerator employed is one of the following: dicyandiamide, pyridine, morpholine, dioctyl sulfide, benzyltrimethylammonium chloride and triphenyl phosphine. Related results are obtained.

*Example VII*

2,3,4,5-tetra(mercaptomethyl)furan is obtained by reacting 2,3,4,5-tetra(chloromethyl)furan with NaSH by the procedure shown in the preceding examples. The resulting product is a light colored liquid.

About 100 parts of Polyether A, 33 parts of the above-noted 2,3,4,5-tetra(mercaptomethyl)furan and 2 parts of dibutyl sulfide and 20 parts of solvent are mixed together with stirring. The resulting fluid composition is spread out as a coating and allowed to cure at 25° C. The film dries hard in a few minutes.

We claim as our invention:

1. A process for curing and resinifying a polyepoxide having more than one vic-epoxy group which comprises mixing and reacting the polyepoxide with a polymercaptan having from 3 to 5 mercapto-substituted side chains of the formula —RSH wherein R is a member of the group consisting of hydrocarbon radicals, thiahydrocarbon radicals and oxahydrocarbon radicals, each of said members containing from 1 to 10 carbon atoms attached to carbon atoms of one or more aromatic hydrocarbon rings.

2. A process for curing and resinifying a polyepoxide having more than one vic-epoxy group which comprises mixing and reacting the polyepoxide with a curing amount of a polymercaptan having from 3 to 5 mercapto-substituted aliphatic side chains of the formula —RSH wherein R is a member of the group consisting of hydrocarbon radicals, thiahydrocarbon radicals and oxahydrocarbon radicals, each of said members containing from 1 to 10 carbon atoms attached to the carbon atoms of one or more aromatic hydrocarbon rings, and in the presence of an accelerator for the epoxy-mercaptan reaction.

3. A process as in claim 2 wherein the polymercaptan has the mercapto-substituted side chains attached to at least two different aromatic rings.

4. A process as in claim 2 wherein the polymercaptan has the formula

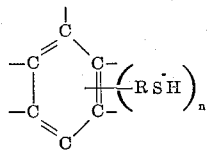

wherein the ring carbon atoms not attached to the RSH groups are attached to a member of the group consisting of hydrogen, halogen and alkyl radicals, and R is a bivalent alkylene radical and $n$ is an ineger of 3 to 5.

5. A process as in claim 2 wherein the polymercaptan has the formula

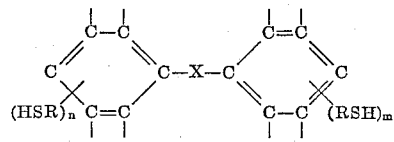

wherein X is a member of the group consisting of alkylene radicals, O, S, SO, $SO_2$ and N, R is an alkylene radical containing 1 to 6 carbon atoms, $n$ and $m$ are integers of at least 1 with the total of $n+m$ being 3 to 5, and the ring carbon atoms not attached to the RSH groups are attached to a member of the group consisting of hydrogen, halogen and alkyl radicals.

6. A process as in claim 2 wherein the polymercaptan is a poly(mercaptoalkyl) substituted benzene.

7. A process as in claim 2 wherein the polymercaptan is a poly(mercaptoalkyl) substituted diphenyl oxide.

8. A process as in claim 2 wherein the polymercaptan is 4-mercaptomethylphenyl - 3',4' - di(mercaptomethyl) phenyl oxide.

9. A process as in claim 2 wherein the accelerator is a tertiary amine.

10. A process as in claim 2 wherein the polyepoxide is a polyglycidyl ether of a polyhydric compound of the group consisting of polyhydric alcohols and polyhydric phenols.

11. A composition comprising a mixture of a polyepoxide having more than one vic-epoxy group and a polymercaptan having from 3 to 5 mercapto-substituted side chains of the formula —RSH wherein R is a member of the group consisting of hydrocarbon radicals, thiahydrocarbon radicals and oxahydrocarbon radicals, each of said members containing from 1 to 10 carbon atoms attached to one or more aromatic hydrocarbon rings.

12. A composition comprising a mixture of a polyepoxide having more than one vic-epoxy group and a poly(mercaptoalkyl) substituted polyphenyl alkane wherein there are at least three mercaptoalkyl groups.

13. A composition comprising a mixture of a glycidyl polyether of a polyhydric phenol and a poly(mercaptoalkyl) substituted diphenyl oxide having from 3 to 5 of the said mercaptoalkyl groups.

References Cited by the Examiner
UNITED STATES PATENTS 2,915,485  12/1959  Shokal _____ 260—47

SAMUEL H. BLECH, *Primary Examiner.*

T. D. KERWIN, *Assistant Examiner.*